UNITED STATES PATENT OFFICE.

PAUL LOBECK, OF LOBTAU, NEAR DRESDEN, SAXONY, GERMANY.

METHOD OF PREPARING COCOA.

SPECIFICATION forming part of Letters Patent No. 341,759, dated May 11, 1886.

Application filed July 8, 1884. Serial No. 137,128. (No model.) Patented in Germany May 24, 1884, No. 30,894; in England June 5, 1884, No. 8,625; in Belgium June 5, 1884, No. 65,398; in France June 5, 1884, No. 162,577; in Spain November 20, 1884, and in Italy December 31, 1884, XXXIV, 411.

*To all whom it may concern:*

Be it known that I, PAUL LOBECK, of Lobtau, near Dresden, in the Empire of Germany, have invented an Improvement in the Manufacture of Cocoa, of which the following is a specification.

This invention relates to improvements in the manufacture of cocoa and products containing the same; and said invention has been secured to me by Letters Patent in the following countries: in Great Britain granted June 5, 1884, No. 8,625, said Letters Patent being granted to Wm. L. Wise as a communication from me; in Germany by Patent No. 30,894, of May 24, 1884; in Belgium by Brevet No. 65,398 of June 5, 1884; in France by Brevet No. 162,577 of June 5, 1884; in Italy by Patent, Vol. XXXIV, No. 411, of December 31, 1884, and in Spain by patent of November 20, 1884.

It has long been sought by chocolate and cocoa manufacturers to extract the most important, nutritious, and blood-making component parts of the cocoa-bean in the form of a product which should be easily and thoroughly digestible, and in which the aromatic substance contained in the cocoa should exhibit a full and agreeable flavor, and lastly, which would not require a long time to cook, but could be easily converted into a beverage ready for the table by merely pouring boiling water over the same.

Hitherto the employment of solutions of alkaline carbonates in the manufacture of cocoa was the means of introducing substances injurious to the digestive organs.

In connection with the manufacture of merchantable cocoa from the cocoa-bean my improved process or method consists in placing in a closed apparatus the cocoa-beans, either in a raw state, roasted, shelled, ground, or otherwise prepared, and subjecting the same in a closed vessel to a high external temperature of about 150° centigrade, and to a steam-pressure of five or six atmospheres for a sufficient period of time to allow the following desired results to be obtained, viz: First, the all-important nutritious group of proteine bodies (albuminates) are converted into a product which is soluble in water; and, second, the starch is converted into a soluble modification known as "dextrine" and "glucose." These two important groups of alimentary substances, the first of which forms about fifteen per cent. of the cocoa proper, the latter forming about from ten to fifteen per cent. of the cocoa-bean, are convertible into soluble products, and thus rendered assimilable by the gastric juices when used in their natural state or when forming a component part of cocoa and boiled with water or milk. Such a favorable action will in all probability extend to the other component parts of cocoa, and particularly to the group of other substances free of nitrogen, which form about from ten to fifteen per cent. of the cocoa-bean, some of the members of which group require to be further chemically treated by other stages or operations in the manufacture, while some others will be converted in an analogous manner to the starch, these changes being necessary for promoting the assimilation of substances containing cocoa.

One of the greatest advantages of this process is that the aroma and taste peculiar to cocoa is retained in its greatest intensity and purity and strength, and contact with external steam heat is prevented.

The cocoa-beans may be subjected to the operation of this new process previously to being either roasted, shelled, ground, or otherwise prepared; but I prefer to employ the ground cocoa-beans, to which water may be added, which cocoa is placed in a vessel capable of being tightly closed and of supporting a powerful external pressure, and the vessel having been carefully closed is placed in another vessel, and is subjected to a high temperature of about 150° centigrade and a steam-pressure of about five or six atmospheres, this pressure and high temperature being transmitted to the cocoa placed inside the vessel a sufficient time for the nutritious substances of the same to be rendered soluble. The time necessary for conducting said process is about thirty minutes.

If the cocoa-butter has not been expressed from the cocoa-beans before the latter are subjected to the aforesaid process, then after said process has been gone through the mass contained in the vessel is removed and may, according to known methods, be freed by pressure with the aid of heat of the fatty matters it contains, and also be further treated for manufacture of cocoa or cocoa-containing products. No alkaline carbonates are employed in the aforesaid process.

I do not herein claim a vessel similar to the well-known digester, wherein the direct contact of steam is employed for treating and reducing animal substances for their fat; nor do I claim the process of cooking canned vegetables by steam heat in a closed vessel.

I claim as my invention—

The process of manufacturing merchantable cocoa from the cocoa-bean, consisting in roasting and peeling the beans, grinding, subjecting to pressure and heat to express the cocoa-butter, and introducing the cocoa or cocoa-containing substances into a vessel and closing the same, and subjecting it to the action of steam heat at a high pressure and temperature of about 150° centigrade to convert the albuminates and starch into soluble products, and then drying and pulverizing, substantially as and for the purposes set forth.

In testimony whereof I have hereunto set my hand in the presence of two subscribing witnesses.

PAUL LOBECK.

Witnesses:
WILHELM WIESENHÜTTER,
MARTIN KÖRNER.